US008271811B2

(12) United States Patent
Sinykin et al.

(10) Patent No.: US 8,271,811 B2
(45) Date of Patent: Sep. 18, 2012

(54) METHODS AND APPARATUS FOR LOAD-BASED POWER MANAGEMENT OF PHY LOGIC CIRCUITS OF A SAS DEVICE BASED UPON A CURRENT WORKLOAD

(75) Inventors: Joshua P. Sinykin, Westboroug, MA (US); Brian A. Day, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 406 days.

(21) Appl. No.: 12/613,437

(22) Filed: Nov. 5, 2009

(65) Prior Publication Data
US 2011/0107129 A1 May 5, 2011

(51) Int. Cl.
*G06F 1/00* (2006.01)
(52) U.S. Cl. ........................................................ 713/300
(58) Field of Classification Search .................... 713/300
See application file for complete search history.

(56) References Cited

U.S. PATENT DOCUMENTS

| | | | |
|---|---|---|---|
| 4,811,216 A | 3/1989 | Bishop et al. | |
| 4,862,342 A | 8/1989 | Dhyanchand | |
| 4,964,040 A | 10/1990 | Wilcox | |
| 5,317,757 A | 5/1994 | Medicke et al. | |
| 5,357,632 A | 10/1994 | Pian et al. | |
| 5,367,678 A | 11/1994 | Lee et al. | |
| 5,432,908 A | 7/1995 | Heddes et al. | |
| 5,434,970 A | 7/1995 | Schiffleger | |
| 5,442,789 A | 8/1995 | Baker et al. | |
| 5,483,656 A | 1/1996 | Oprescu et al. | |
| 5,553,073 A | 9/1996 | Barraclough et al. | |
| 5,553,305 A | 9/1996 | Gregor et al. | |
| 5,623,634 A | 4/1997 | Liu | |
| 5,630,132 A | 5/1997 | Allran et al. | |
| 5,838,766 A | 11/1998 | Rand | |
| 6,092,098 A | 7/2000 | Araki | |
| 6,233,630 B1 | 5/2001 | Wilhelm, Jr. | |
| 6,408,394 B1 | 6/2002 | Vander Kamp et al. | |
| 7,284,244 B1 | 10/2007 | Sankaranarayan | |
| 7,506,080 B2 * | 3/2009 | Lau et al. | 710/22 |
| 7,555,666 B2 | 6/2009 | Brundridge et al. | |
| 2002/0013832 A1 | 1/2002 | Hubbard | |

(Continued)

OTHER PUBLICATIONS

Eymann et al., "Decentralized vs. Centralized Economic Coordination of Resource Allocation in Grids," Polytecnic University of Catalina, Barcelona, France.

*Primary Examiner* — Mohammed Rehman
(74) *Attorney, Agent, or Firm* — Duft Bornsen & Fishman LLP (57) ABSTRACT

Apparatus and method for managing power consumption of circuits within a Serial Attached SCSI (SAS) device. A SAS device having a plurality of PHY logic circuits includes a queue manager and a power manager. The queue manager is operable to determine a current workload based on queued entries for the plurality of PHY logic circuits. Based on the current workload, the power manager is operable to set identified ones of the plurality of PHY logic circuits into a low power mode. In some embodiments, PHY logic circuits may be restored to full power operation responsive to changes in the current workload and/or responsive to receipt of a signal from another SAS device coupled to the SAS device. In other embodiments the power manager is further operable to manage power consumption of link and/or DMA logic circuits of the SAS device.

18 Claims, 5 Drawing Sheets

U.S. PATENT DOCUMENTS

| | | |
|---|---|---|
| 2002/0018481 A1 | 2/2002 | Mor et al. |
| 2005/0210159 A1* | 9/2005 | Voorhees et al. .................. 710/5 |
| 2005/0268010 A1* | 12/2005 | Igari ............................. 710/100 |
| 2006/0031612 A1* | 2/2006 | Bashford et al. ................ 710/74 |
| 2006/0184287 A1* | 8/2006 | Belady et al. .................. 700/291 |
| 2009/0204826 A1* | 8/2009 | Cox et al. ...................... 713/320 |

* cited by examiner

METHODS AND APPARATUS FOR LOAD-BASED POWER MANAGEMENT OF PHY LOGIC CIRCUITS OF A SAS DEVICE BASED UPON A CURRENT WORKLOAD

BACKGROUND

1. Field of the Invention

The invention relates generally to management of power consumption by devices and more specifically relates to management of power consumption by a plurality of devices in a storage system based on work load of the plurality of devices.

2. Related Patents

This patent is related to commonly owned U.S. patent application Ser. No. 12/510,699 entitled METHODS AND APPARATUS FOR POWER ALLOCATION IN A STORAGE SYSTEM which is hereby incorporated by reference.

3. Discussion of Related Art

In a variety of electronic systems, including storage systems, a number of devices (e.g., storage devices) of the system may be under control of a common control unit. For example, in storage systems each one or more storage controllers may be coupled with a plurality of storage devices. The controllers and the storage devices each consume significant power even when in an idle state. Still more specifically, the communication interfaces in the storage controllers and the storage devices consume power even when idle if the communication medium and/or protocol require that an idle communication path continuously send and receive signals during an idle period in which no application data is exchanged between the devices. For example, in a Serial Attached SCSI (SAS) environment, the PHY layer logic (physical link control logic) of coupled devices exchange idle dwords during such idle periods.

Such a continuous stream of exchanged signals during an idle period may consume significant power in the system serving no purpose useful to the intended purposes of exchanging data. In view of such wasted power consumption some prior techniques have sought through manual means (i.e., an administrative user) to hold a communication port (e.g., a SAS PHY) in a reset state or simply completely turn off the communication port. When an administrator recognizes that work loads between the two devices are not being processed fast enough the administrator may manually re-configure the held off port to re-enable communications between the devices.

Such manual operations to enable/disable a communication port to reduce wasteful power consumption are cumbersome and cannot rapidly correct performance bottlenecks where a disabled port needs to be re-enabled to resume desired levels of performance. The manual re-enabling of a disabled port may not be performed quickly in response to changing work loads if the administrative user is unaware of the changes in loading of the system. Further holding a port in reset or completely powering down the PHY logic typically adds to the recovery time once the administrative user determines to re-enable the port. Powering off a logic circuit or applying a reset signal to an interface circuit typically performs a "hard" (e.g., complete) reset of all logic and gates in the interface circuit. The current configuration and state of the logic circuits in such an interface would then be reset to a default power on status-losing the state as previously configured (e.g., by "start of day" processing) and the state of the port as it was most recently operating. In such a case, further logic or administrative steps may be required to restore the configuration and state of the interface circuit to allow continued operation. Such additional logic or administrative steps could be time consuming thus slowing the process of re-enabling the disabled port.

Still further, prior, substantially manual techniques may reduce power consumption of just a single layer of the protocol stack of related logic layers. For example, an administrative user may hold the lowest level PHY logic of a SAS device in a reset state to reduce its power consumption but other layers (such as link, port, transport, and application layers) may remain operable and consuming power (to whatever they can continue to operate with a disabled PHY layer).

Thus it is an ongoing challenge to manage communication paths between devices, for example between SAS devices, to reduce wasteful power consumption.

SUMMARY

The present invention solves the above and other problems, thereby advancing the state of the useful arts, by providing apparatus and methods within a SAS device to automatically manage power consumption of components within the SAS device. Based on the present workload in the SAS device as measured by a number of queued entries, one or more: PHY logic circuits, link logic circuits, and/or Direct Memory Access (DMA) logic circuits within the SAS device may be forced into a low power mode. Similarly based on a number of queued entries, one or more such components may be restored to full power operational mode to process backlogged queued entries more quickly. Further, a signal indicating an incoming transmission from another SAS device coupled to a PHY logic circuit presently in a low power mode permits the power manager of the SAS device to immediately restore the PHY logic circuit (and other associated components) to a full power operational mode.

In one aspect hereof, apparatus in a Serial Attached SCSI (SAS) device is provided. The apparatus includes a plurality of PHY logic circuits and a power manager circuit coupled with the plurality of PHY logic circuits. The apparatus also includes a memory adapted for storing queued entries representing information to be transmitted from the SAS device using one or more of the plurality of PHY logic circuits and a queue manager coupled with the memory and coupled with the power manager circuit, the queue manager operable to determine a current workload based on entries in the memory. The power manager circuit is operable to control the power consumption of the plurality of PHY logic circuits based on the current workload.

Another aspect hereof provides a Serial Attached SCSI (SAS) device that includes a plurality of PHY logic circuits and a plurality of link logic circuits. Each link logic circuit is coupled with an associated PHY logic circuit of the plurality of PHY logic circuits. The device also includes a memory adapted for storing queued entries representing information to be transmitted from the SAS device using any of the plurality of link logic circuits and/or using any of the plurality of PHY logic circuits. The device also includes one or more Direct Memory Access (DMA) logic circuits. Each DMA logic circuit coupling the memory to one or more of the plurality of link logic circuits and/or one or more of the plurality of PHY logic circuits. The device further includes a power manager circuit coupled with the plurality of PHY logic circuits and coupled with the plurality of link logic circuits and coupled with the one or more DMA logic circuits and a queue manager coupled with the memory and coupled with the power manager circuit. The queue manager is operable to determine a current workload based on entries in the memory. The power manager circuit is operable to control the power consumption of any of the plurality of PHY logic circuits and/or of any of the plurality of link logic circuits and/or any of the one or more DMA logic circuits wherein the control of power consumption is based on the current workload.

Yet another aspect hereof provides a method operable in a Serial Attached SCSI (SAS) device, the SAS device comprising a plurality of PHY logic circuits. The method includes determining, by operation of a queue manager in the SAS device, a current workload based on entries in a queue of the SAS device where each entry corresponds to a SAS exchange utilizing one or more of the plurality of PHY logic circuits. The method also includes identifying, by operation of a power manager in the SAS device, from the current workload, one or more PHY logic circuits that may be placed in a low power mode and setting, by operation of the power manager, the identified PHY logic circuits into a low power mode.

DETAILED DESCRIPTION OF THE DRAWINGS

Figure 1:
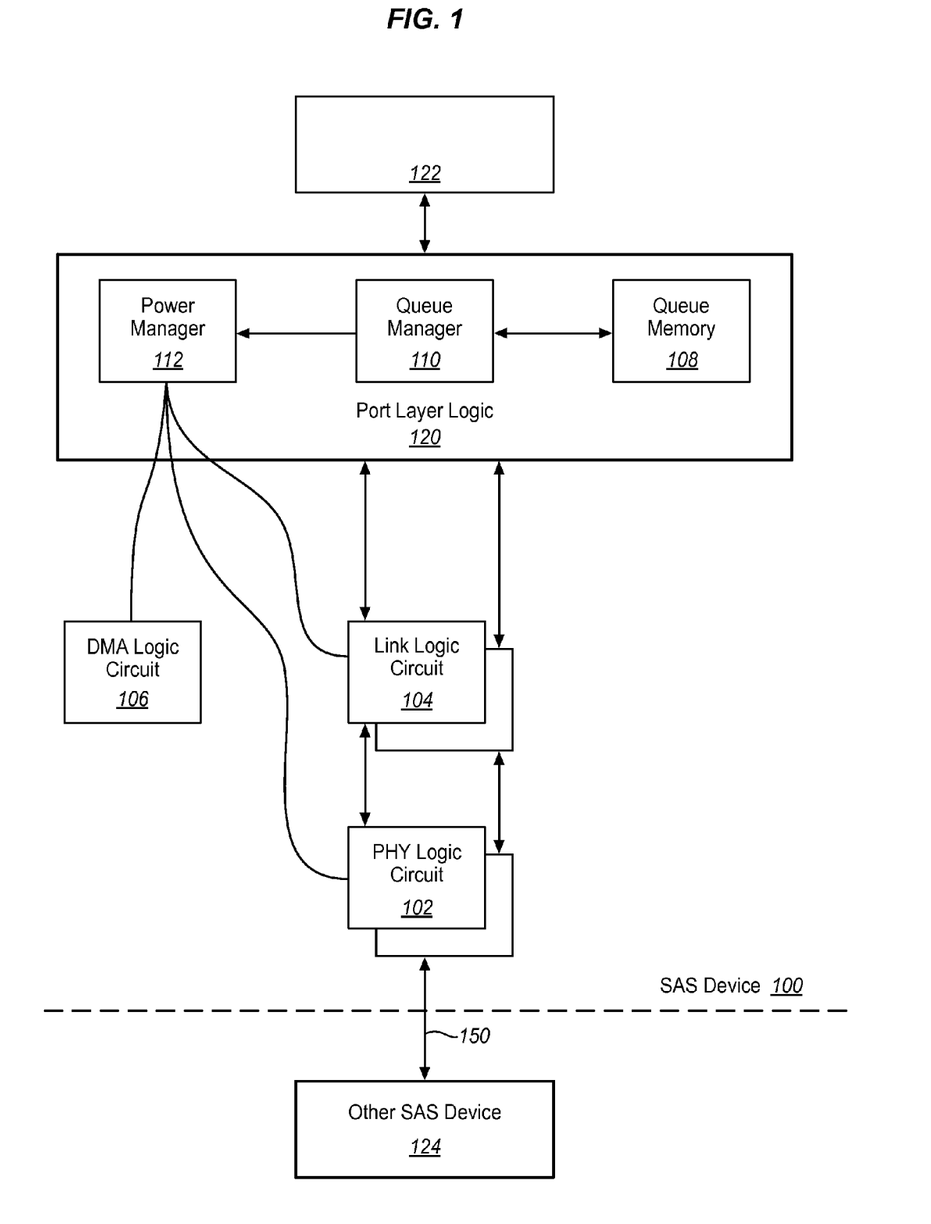
FIG. 1 is a block diagram of an exemplary SAS device enhanced in accordance with features and aspects hereof to manage power consumption by components of the SAS device.

FIG. 1 is a block diagram of a SAS device 100 enhanced in accordance with features and aspects hereof to provide dynamic, automated, power management of components within the device 100. SAS device 100 includes port layer logic 120 coupled with one or more link logic circuits 104 which are, in turn, coupled with PHY logic circuits 102. Still higher levels of logic represented as transport and application layer logic 122 may also be present within SAS device 100. The various layers of logic circuits are generally known in accordance with the SAS specifications well known to those of ordinary skill in the art. The SAS specifications include specific state machine model requirements for operation of each of the various layers of communication logic. SAS specifications are well known to those of ordinary skill in the art and are readily available at, for example, www.t10.org.

In accordance with features and aspects hereof, power manager 112 may be implemented within port layer logic 120 to manage power consumption of other components within the SAS device 100. In particular, power manager 112 may be coupled with each of one or more link logic circuits 104, with each of multiple PHY logic circuits 102, and/or with each of one or more Direct Memory Access (DMA) logic circuits 106. Thus, as used herein, "components" of the SAS device 100 includes link logic circuits 104, PHY logic circuits 102, and or DMA logic circuits 106—any or all of which may be controlled by power manager 112. PHY logic circuits 102 generally handle lower level SAS protocol communication features to exchange signals with another SAS device 124 via SAS communication medium 150. Link logic circuit 104 handles a next higher layer of the SAS protocol stack corresponding to the link layer specifications in the SAS standards. Queue memory 108 may be present within port layer logic 120 for storing information to be transmitted via one or more of multiple link logic circuits 104 and/or PHY logic circuits 102. DMA logic circuits 106 are generally present in a typical SAS device 100 to allow for rapid transfer of information between one or more of the multiple PHY logic circuits 102 and the queue memory 108 and/or between one or more of the multiple link logic circuits 104 and queue memory 108.

In accordance with features and aspects hereof, power manager 112 interacts with queue manager 110 to determine a current workload based on entries presently queued in queue memory 108 for each of the multiple components (e.g., each of link logic circuits 104, each of PHY logic circuits 102, and/or each of DMA logic circuits 106). In addition, power manager 112 through queue manager 110 may also thus determine the total workload based on entries presently queued in queue memory 108. In addition to the interaction with power manager 112, queue manager 110 also serves within port layer logic 120 of SAS device 100 to manage the entries in queue memory 108 that are exchanged between the lower layer logic elements (102 and 104) and the higher layer logic elements (122).

Though depicted in FIG. 1 as physically associated with port layer logic 120, those of ordinary skill in the art will recognize that queue memory 108 and queue manager 110 may be physically associated with any suitable layer of logic within SAS device 100. Queue manager 110 and queue memory 108 are logically associated with various layers of logic within SAS device 100 (including one or more of: port layer 120, transport layer logic 122, link logic circuit 104, PHY logic circuit 102, and DMA logic circuit 106). Thus, queue manager 110 and queue memory 108 may be physical configured anywhere in SAS device 100 as a matter of design choice such that it may determine the present workload queued for any or all of the various components of SAS device 100.

Based on the current workload (e.g., number of entries queued or other workload measurements) so determined, power manager 112 may identify components that may be configured/set into a low-power consumption mode/state to reduce power consumption of SAS device 100. In like manner, based on the current workload (e.g., number of queued entries or other workload measurements) so determined, power manager 112 may also identify components that may be restored to a full power operational mode. In general, where the workload falls below a predetermined threshold value, power manager 112 may identify particular components (e.g., one or more link logic circuits and/or one or more PHY logic circuits, and/or one or more DMA logic circuits) to be set into a low-power consumption mode. In such a low-power consumption mode, the communication path associated with the PHY logic circuits 102 and/or other components set into a low-power consumption mode is disabled. Other PHY logic circuits 102 that remain enabled (i.e., not in a low-power mode) may then be used for transferring information associated with queued entries of queue memory 108. Conversely, where power manager 112 determines that the workload (e.g., number of queued entries) in queue memory 108 has risen above one or more predetermined threshold values, power manager 112 may identify particular components to be restored to full power operational mode to aid in processing a backlog of queued entries. In addition, if a signal is received from other SAS device 124 directed via path 150 to a PHY logic circuit 102 presently in a low-power consumption mode, power manager 112 will immediately restore full power operational mode to the identified PHY logic circuit 102 to allow reception of an incoming SAS transmission.

More specifically, the transport layer logic 122 and/or port layer logic 120 may interact with queue manager 110 to determine components that may be toggled between a low power consumption mode and a normal power consumption mode based on the presently queued workload in the queue memory 108. Further, port layer logic 120 may interact with link layer logic circuits 104 and/or PHY logic circuits 102 to determine if another device has initiated communication such that SAS device 100 must "awaken" a component that was previously toggled into a low power consumption mode.

The threshold values used by power manager 112 may be predetermined and statically stored in association with power manager 112 or may be dynamically determined and reprogrammed by an administrative user of SAS device 100. In particular, a first threshold may be used to determine when one or more components of the SAS device may be set into a low-power consumption mode while a second threshold value may be used to determine when one or more identified component should be restored to full power operational mode. The first and second threshold values may be a single common value or may be different values to allow some hysteresis in the processing of power manager 112 to control power consumption of components within the enhanced SAS device 100. Still further, a sequence of threshold values defining ranges of workload may be utilized to determine the number of components within the enhanced SAS device 100 desired to be running in a full power operational mode to process the workload. For example, where the number of queued entries is the measured workload, if the total number of queued entries is between 0 and 32, one PHY logic circuit 102 (and corresponding link logic circuit 104) may be deemed sufficient for processing the backlog of queued entries. If the total number of queued entries is between 32 through 128, two PHY logic circuits 102 (and corresponding link logic circuits 104) may be deemed appropriate for handling the workload. If the number of queued entries is between 128 and 512, three PHY logic circuits 102 (and associated link logic circuits 104) may be appropriate. These exemplary threshold ranges are intended merely to suggest possible designs to one of ordinary skill in the art such that multiple threshold values may be used to determine a desired number of active links and associated PHY logic circuits for processing a backlog of queued entries. Additional PHY logic circuits 102 and link logic circuits 104 above the number of desired active circuits so determined may thus be candidates for setting into a low-power mode to reduce power consumption by SAS device 100.

In like manner, power manager 112 may also determine which of multiple DMA logic circuits 106 may be set into a low-power mode for further power consumption reduction in SAS device 100. In some SAS devices, each PHY logic circuit 102 and/or link logic circuit 104 may be associated with a corresponding DMA logic circuit 106. In other embodiments, a few (or even one) DMA logic circuits 106 may be present as shared resources within SAS device 100 to be used in exchanges with any of the link or PHY logic circuits and the queue memory. In embodiments where the DMA logic circuits 106 represent shared resources within SAS device 100, similar threshold comparisons regarding the current workload may be applied for determining how many DMA logic circuits 106 to keep active in a full power operational mode.

As shown in FIG. 1, each PHY logic circuit 102 may be associated with a corresponding link logic circuit 104. As known to those of ordinary skill in the art, other embodiments utilize fewer link logic circuits 104 adapted to control multiple associated PHY logic circuits 102. In such embodiments, power manager 112 may utilize different threshold values for identifying link logic circuits 104 to be set into a low-power mode versus those to be maintained in a full power operational mode. Those of ordinary skill in the art will recognize a variety of configurations for providing a mixture of PHY logic circuits 102, link logic circuits 104, and DMA logic circuits 106 within a SAS device 100 to provide the desired level of performance for the SAS device. Thus any number of link logic circuits 104, PHY logic circuits 102 and an appropriate number of DMA logic circuits 106 may be implemented within and enhanced SAS device 100 that incorporates power management features and aspects hereof.

Queue manager 110 and power manager 112 may determine the current workload presently queued for a component based on a variety of criteria including, for example, the number of entries in queue memory 108. Other criteria may include, for example, the total volume of queued workloads for each of various components, which could be determined based on the size of the underlying I/O request associated with each queued entry. Alternatively, for example, queued workloads could be associated with a particular originating process or type of transaction. Higher priority workloads (e.g., database transactions) may require more immediate attention (hence more fully operational links/PHYs). Lower priority workloads (e.g., backup/archive operations) may be deferred while the SAS device operates in a degraded mode with more links/PHYs toggled to a low power consumption state. For such other workload performance measurement, appropriate threshold values may be defined as a matter of design choice. These and other exemplary measurements of presently queued workload, or combinations of such measurements, may be applied as a matter of design choice for a particular application environment.

Figure 2:
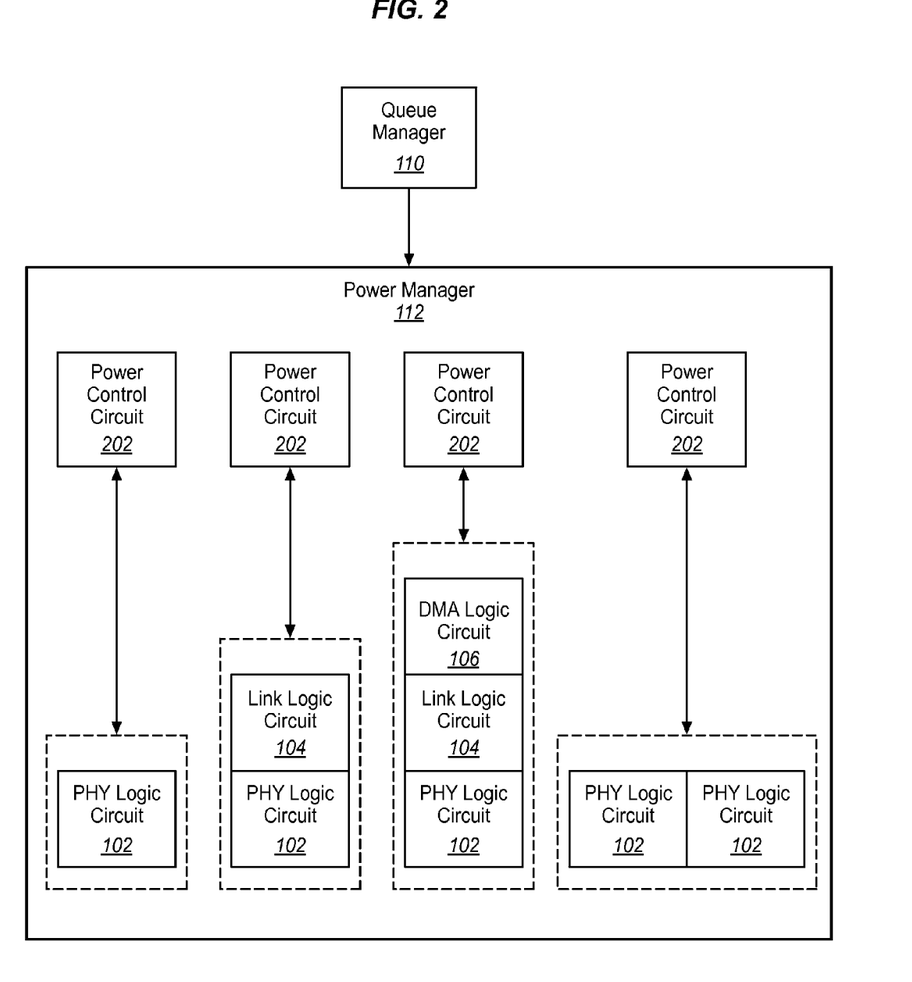
FIG. 2 is a block diagram providing exemplary additional details of an embodiment of a power manager as shown in FIG. 1.

FIG. 2 is a block diagram providing exemplary additional details of an implementation of power manager 112 of FIG. 1. Power manager 112 may include a plurality of power control circuits 202 each coupled with a corresponding set of one or more components for which the power consumption is to be managed. For example, a power control circuit 202 may be coupled with each PHY logic circuit 102. In other embodiments, each power control circuits 202 may be coupled with an associated pair of a link logic circuit 104 and a PHY logic circuit 102. In still other embodiments where each link and PHY logic circuit is associated with a corresponding DMA logic circuit, a power control circuit 202 may be coupled with a combination of a DMA logic circuit 106, a link logic circuit 104, and a PHY logic circuit 102. In other embodiments, each power control circuit 202 may be coupled with multiple PHY logic circuits 102 (and/or multiple link logic circuits 104 and/or multiple DMA logic circuits 106).

Figure 3:
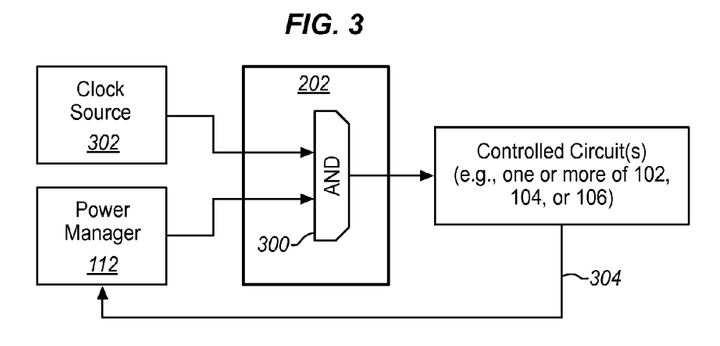
FIGS. 3, 4, and 5 are block diagrams depicting exemplary embodiments of a power control circuit associated with a power manager of FIGS. 1 and 2.
Figure 4:
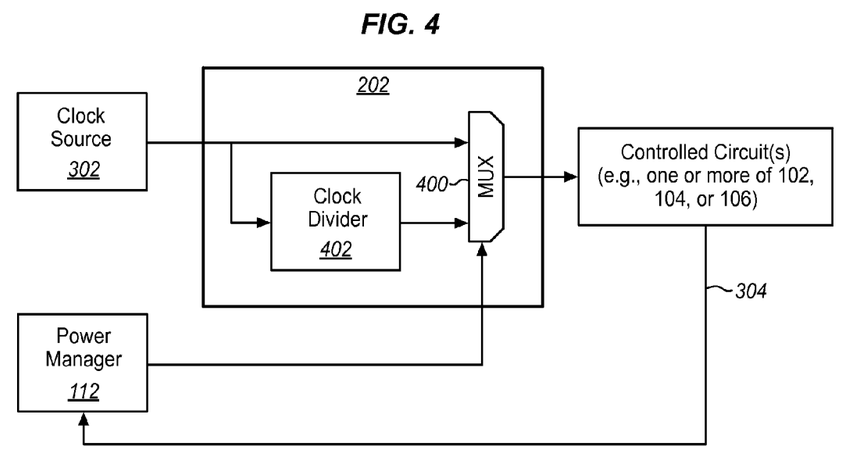
Figure 5:
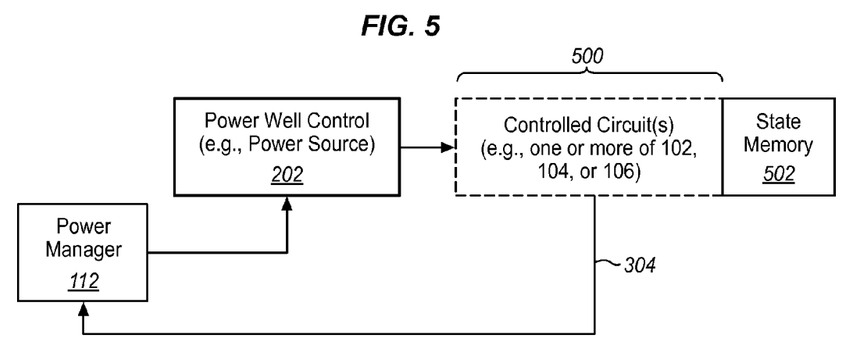

FIGS. 3, 4, and 5 are block diagrams providing exemplary additional details of power control circuits of the power manager 112. In one exemplary embodiment depicted in FIG. 3, the power control circuit 202 of power manager 112 may provide gating logic to disable the clock signal applied to the controlled components (e.g., one or more of PHY logic circuits 102, one or more link logic circuits 104, and/or one or more DMA logic circuits 106). In particular, power manager logic within power manager 112 may set a controlled circuit into a low-power consumption mode by applying an appropriate signal as an input to AND gate 300 within power control circuit 202. The other input to AND gate 300 is the clock signal from clock source 302 normally used to apply a clock signal to the controlled circuit. The output of AND gate 300 thus represents the gated clock signal to be applied to a controlled circuit. When power manager 112 applies an appropriate signal to AND gate 300, the controlled circuit will be disabled in that no logic therein will be clocked thus lowering power consumption of the controlled circuit.

FIG. 4 provides a block diagram of another exemplary embodiment of a power control circuit 202 associated with power manager 112. The power control circuit 202 of FIG. 4 provides a means for slowing the clock frequency applied to one or more controlled circuits. The clock source 302 normally applied to the controlled circuits is instead applied as a first input to multiplexer 400 within power control circuit 202. A clock divider circuit 402 within power control circuit 202 also receives the standard frequency clock signal from clock source 302 and divides it into a lower frequency clock signal applied as a second input to multiplexer 400. Logic within power manager 112 then generates a signal indicating that the controlled circuits should be set to a low-power consumption mode. Such a signal is applied as the selection input to multiplexer 400 to select either the nominal higher frequency clock signal or the lower frequency signal for application as a clock signal to the controlled circuits. By so controlling the operation of the controlled circuits to utilize a lower frequency clock signal, logic of the controlled circuit is clocked more slowly and thus power consumption of the controlled circuit is reduced.

FIG. 5 is a block diagram providing another exemplary embodiment of power control circuitry 202 associated with power manager 112. In the embodiments of FIGS. 3 and 4, the controlled circuits still have power applied but are clocked at a slower frequency or not clocked such that logic within the controlled circuit does not change rapidly. In the embodiment of FIG. 5, a power source for the controlled circuit is simply turned off by a signal generated by power manager 112. The controlled circuit may include combinatorial or sequential logic portion 500 and state memory portion 502 in which status and other state related information may be stored for operation of the logic portion 500. In such an embodiment, it may be important that state information stored in the state memory 502 to be retained despite the loss of power applied to the controlled circuit. Retaining the present configuration and state of the controlled circuit is important to reduce the time required to bring the controlled circuit back to a full power operational mode. In one common design approach a "power well" may associate all circuits designed within the "well" with a corresponding power source. Thus the power source for a particular "well" may be shut off without affecting other "power wells" of the same integrated circuit. As shown in FIG. 5, the logic portion 500 of the controlled circuit may be in a first "power well" while the state memory 502 of the controlled circuit may be designed in a separate "power well". In still other alternative embodiments, state memory 502 portions of the controlled circuit may be implemented utilizing nonvolatile memory components such as flash memory, EEPROM, etc. so that it too may be powered off in the same "power well" but still retain it's configuration and state information to allow quick resumption of normal, full power operation.

As noted above with respect to FIGS. 1 and 2, power manager 112 may restore full power operational mode to a controlled circuit in response to changes in the backlogged workload represented by an increase in the current workload. Thus power manager 112, in conjunction with a queue manager (of FIG. 1) may determine that the present workload has increased to a point where resumption of full power operation to one or more controlled circuits is desired. In addition, receipt of information from another SAS device coupled to the SAS device enhanced with power management features hereof may also give rise to a need for immediately restoring full power operational mode to one or more controlled circuits. In the exemplary embodiments of FIGS. 3, 4, and 5, the controlled circuits may provide a signal returned to power manager 112 via path 304 indicating a need to restore full power operational mode to the controlled circuit. For example, receipt of any signal on a SAS communication medium coupled to a PHY logic circuit may cause such a signal to be applied to path 304 to cause power manager 112 immediately restore full power operational mode to the controlled circuit.

Figure 6:
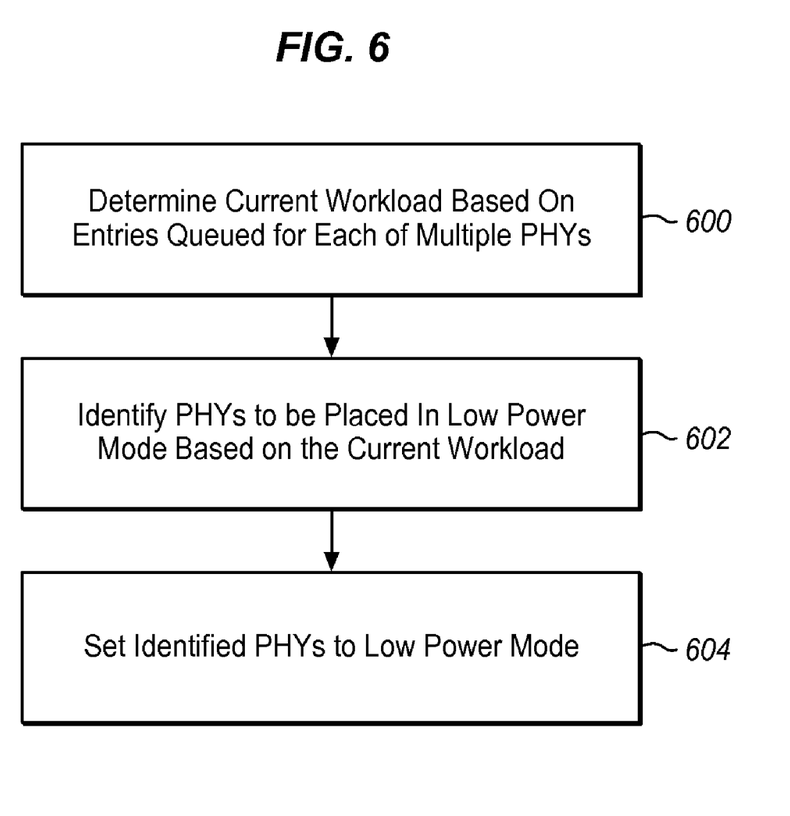
FIGS. 6 and 7 are flowcharts describing exemplary methods in accordance with features and aspects hereof to manage power consumption within a SAS device.

FIG. 6 is a flowchart describing an exemplary method in accordance with features and aspects hereof to provide automated, dynamic power management of components within a SAS device based on a measurement of current workload. The method of FIG. 6 may be operable, for example, in a structure such as described above with respect to FIGS. 1 through 5. Step 600 represents processing by the power management enhanced features of the SAS device to determine a current workload for each of multiple PHYs within the SAS device. As noted above, processing of step 600 may determine both a total workload based on entries queued for all components of the SAS device as well as a current workload for each of the multiple PHYs. Still further, processing the step 600 may identify current workload not only for multiple PHYs but also for one or more link layer logic elements and DMA logic elements within the SAS device. Based on the current workload so determined by processing step 600, step 602 next identifies one or more PHYs (or other logic elements within the SAS device) to be placed in a low-power mode. Based on the total workload (e.g., the total volume of work queued for all components of the SAS device), the power management processing of the step 602 may determine the number of PHYs (or other components within the SAS device) necessary to adequately process the present backlog of queued entries. Any PHYs or other components within the SAS device above and beyond this necessary number may be identified as candidates for placement into the low-power mode to reduce power consumption of the SAS device. Step 604 then sets the one or more identified PHYs (or other components) into a low-power mode.

Figure 7:
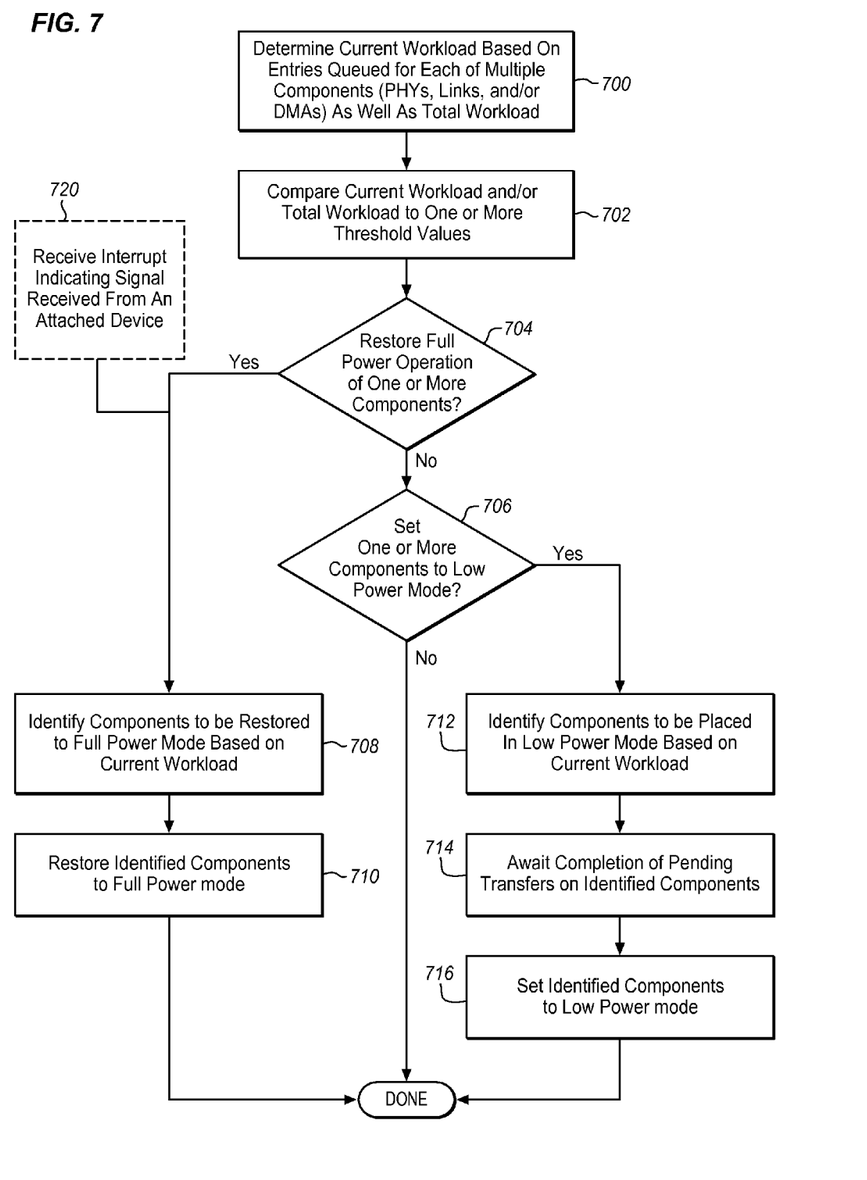

FIG. 7 is a flowchart describing another exemplary method in accordance with features and aspects hereof to provide automated, dynamic power management within an enhanced SAS device. The method of FIG. 7 may be operable within, for example, a system such as described above with respect to FIGS. 1 through 5. The method of FIG. 7 may be performed on a periodic basis or in any iterative manner during operation of the SAS device. The repeated operation of the method of FIG. 7 allows for essentially continuous adjustment of the number of components within the SAS device operating in a full powered mode or set to a low-power mode to reduce power consumption as required to adequately process the current workload queued within the SAS device.

Step 700 determines the current workload based on queued entries for each of multiple components (PHYs, links, DMAs, etc.) within the enhanced SAS device. Processing of step 700 may also determine the total workload in addition to the current workload for each of the multiple components. Step 702 then compares the determined workload value to one or more threshold values associated with operation of the SAS device. The threshold values may be statically determined by the manufacturer of the SAS device, may be determined by an administrative user and set at installation or startup of the SAS device, may be dynamically determined by operation of tuning algorithms within the SAS device, and/or may be determined as required by an administrative user reconfiguring threshold values in response to observed performance of the SAS device. A first threshold value may be used to determine whether more components within the SAS device may be entered into a low-power mode while a second threshold value may be used to determine whether additional components within the SAS device needs to be restored to full power operational mode. The first and second threshold values may be one and the same values or may be different values to allow for some hysteresis in the reconfiguration during repeated operations of the method of FIG. 7. Still further, multiple threshold values may be used to determine the preferred number of components within the SAS device for processing of the current workload level. For example, where workload is determined as the number of queued entries, a first threshold value may indicate that components for only a single communication path may be sufficient if the number of queued entries is less than 32. A second threshold value of 128 may be used to indicate that components representing at least two communication paths in the SAS device should remain in a full power operational state. Yet another threshold value of 512 queued entries may indicate that components for three communication paths are desirable to process the current workload. Components above and beyond this desired number of communication paths may then be candidates for setting to a low power mode to reduce power consumption. Those of ordinary skill in the art will readily recognize a wide variety of threshold values including definition of ranges of threshold values to represent the workload of the SAS device and a corresponding number of operational communication paths (and associated components thereof) desired to process the current workload.

Based on the comparison of step 702, step 704 determines whether components previously set to a low-power state should now be restored to a full power operational mode based on the comparison the step 702. If so, steps 708 and 710 next identify which of the previously powered down components should be restored to full power operational mode based on the current workload. Having so identified which components are to be restored to full power operational mode, step 710 restores the identified components to full power operational mode (i.e., by signals generated in a power control circuit of the power manager logic). The method of FIG. 7 is then complete and may be performed anew after expiration of a predetermined period of time or based on other criteria.

Steps 708 and 710 may also be performed asynchronously in response to receipt of a signal indicating an inbound transmission from another SAS device coupled with a PHY logic circuit presently set to a low power mode. Step 720 represents the asynchronous detection of such an incoming signal causing the execution of steps 708 and 710.

If step 704 determines that there is no present need to restore full power operational mode to one or more components, step 706 determines, based on the comparison of step 702, whether one or more components should now be set to the low-power mode based on the current workload. If not, processing of the method of FIG. 7 is complete and may be performed anew after expiration of a predetermined period of time or based on other criteria. If step 706 determines that some number of components should be set to the low-power mode, step 712 identifies which components are to be placed in the low-power mode based on a number of factors. First and foremost, a component will only be set to the low-power mode after any operation/transfer presently utilizing the component is completed. In addition the current workload based on entries presently queued for each component may be factored into the determination of which component should be placed in the low-power mode. For example, if a particular component has no requests presently queued, it may be a preferred candidate for being shut down into a low-power mode. Step 714 then awaits completion of any presently pending operations/transfers utilizing the identified components. When all such pending transfers have completed, or as each pending transfer is completed, the identified components may be set to the low-power mode to conserve power consumption by the SAS device.

Those of ordinary skill in the art will readily recognize numerous additional and equivalent steps in the methods of FIGS. 6 and 7 described above. Such additional and equivalent steps are omitted herein for simplicity and brevity of this discussion.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. Apparatus in a Serial Attached SCSI (SAS) device, the apparatus comprising:
   a plurality of PHY logic circuits;
   a power manager circuit coupled with the plurality of PHY logic circuits;
   a memory adapted for storing queued entries representing information to be transmitted from the SAS device using one or more of the plurality of PHY logic circuits; and
   a queue manager coupled with the memory and coupled with the power manager circuit, the queue manager operable to determine a current workload based on entries in the memory,
   wherein the power manager circuit is operable to control the power consumption of the plurality of PHY logic circuits based on the current workload, and
   wherein the power manager circuit comprises one or more of:
      a plurality of clock gating circuits each coupled with a corresponding one of the plurality of PHY logic circuits, each clock gating circuit operable to controllably enable and disable a clock signal coupled with the corresponding PHY logic circuit;
      a clock frequency control circuit coupled with a clock source coupled with a corresponding one of the plurality of PHY logic circuits, the clock frequency control circuit operable to controllably increase or decrease the frequency of the clock source coupled with the corresponding PHY logic circuit; or
      a plurality of power well control circuits each coupled with a power well associated with a corresponding one of the plurality of PHY logic circuits.

2. The apparatus of claim 1 further comprising:
   at least one link logic circuit coupled with the power manager circuit and associated with the plurality of PHY logic circuits,
   wherein the memory is further adapted to store queued entries representing information to be transmitted from the SAS device using the at least one link logic circuit,
   wherein the power manager circuit is further operable to control the power consumption of the at least one link logic circuit based on the current workload.

3. The apparatus of claim 1 further comprising:
at least one direct memory access (DMA) logic circuit coupled with the power manager circuit and associated with the plurality of PHY logic circuits,
wherein the memory is further adapted to store queued entries representing information to be transmitted from the SAS device using the at least one DMA logic circuit,
wherein the power manager circuit is further operable to control the power consumption of the at least one DMA logic circuit based on the current workload.

4. The apparatus of claim 1
wherein the power manager comprises the plurality of power well control circuits each associated with a power well of a corresponding PHY logic circuit wherein the each power well control circuit is operable to controllably switch power on and off for the associated power well of a corresponding PHY logic circuit.

5. The apparatus of claim 1
wherein the power manager is further operable to await completion of a transfer operation presently using a PHY logic circuit before reducing the power consumption of the PHY logic circuit.

6. The apparatus of claim 1
wherein the power manager is further operable to control power consumption by a an identified PHY logic circuit by restoring normal operation of the identified PHY logic circuit in response to sensing receipt of a signal from another SAS deice coupled to the SAS device through the identified PHY logic circuit.

7. A Serial Attached SCSI (SAS) device comprising:
a plurality of PHY logic circuits;
a plurality of link logic circuits each link logic circuit coupled with an associated PHY logic circuit of the plurality of PHY logic circuits;
a memory adapted for storing queued entries representing information to be transmitted from the SAS device using any of the plurality of link logic circuits and/or using any of the plurality of plurality of PHY logic circuits;
one or more Direct Memory Access (DMA) logic circuits, each DMA logic circuit coupling the memory to one or more of the plurality of link logic circuits and/or one or more of the plurality of PHY logic circuits;
a power manager circuit coupled with the plurality of PHY logic circuits and coupled with the plurality of link logic circuits and coupled with the one or more DMA logic circuits; and
a queue manager coupled with the memory and coupled with the power manager circuit, the queue manager operable to determine a current workload based on entries in the memory,
wherein the power manager circuit is operable to control the power consumption of any of the plurality of PHY logic circuits and/or of any of the plurality of link logic circuits and/or any of the one or more DMA logic circuits wherein the control of power consumption is based on the current workload, and
wherein the power manager comprises one or more of:
a plurality of clock gating circuits each coupled with one or more associated circuits the associated circuits comprising: the plurality of PHY logic circuits, the plurality of link logic circuits, and the one or more DMA logic circuits, each clock gating circuit operable to controllably enable and disable a clock signal coupled with the one or more associated circuits;
a plurality of clock frequency control circuits each coupled with one or more associated circuits the associated circuits comprising: the plurality of PHY logic circuits, the plurality of link logic circuits, and the one or more DMA logic circuits, each clock frequency control circuit operable to controllably increase or decrease the frequency of a clock source coupled with the one or more associated circuits; or
a plurality of power well control circuits each coupled with one or more power wells coupled with one or more associated circuits the associated circuits comprising: the plurality of PHY logic circuits, the plurality of link logic circuits, and the one or more DMA logic circuits, each power well control circuit operable to controllably switch power on and off for the associated power well.

8. The SAS device of claim 7
wherein the queue manager is operable to determine a current workload associated with each of the one or more DMA logic circuits and to determine a current workload associated with each of the plurality of link logic circuits and to determine a current workload associated with each of the plurality of PHY logic circuits, and
wherein the power manager is operable to control power consumption of an identified circuit of the plurality of PHY logic circuits or an identified circuit of the plurality of link logic circuits or an identified circuit of the one or more DMA logic circuits based on the current workload for the identified circuit.

9. The SAS device of claim 7
wherein the queue manager is operable to determine a current workload associated with each of the one or more DMA logic circuits and to determine a current workload associated with each of the plurality of link logic circuits and to determine a current workload associated with each of the plurality of PHY logic circuits, and
wherein the power manager is operable to control power consumption of an identified circuit of the plurality of PHY logic circuits or an identified circuit of the plurality of link logic circuits or an identified circuit of the one or more DMA logic circuits based on one or more of: the current workload for the identified circuit or the total of the current workloads for any of the plurality of PHY logic circuits or any of the plurality of link logic circuits or any of the one or more DMA logic circuits.

10. The SAS device of claim 7
wherein the power manager comprises:
a plurality of power control circuits where each of the power control circuits is coupled with one or more of the plurality of PHY logic circuits, and/or is coupled with one or more of the plurality of link logic circuits, and/or is coupled with the one or more DMA logic circuits.

11. A method operable in a Serial Attached SCSI (SAS) device, the SAS device comprising a plurality of PHY logic circuits, the method comprising:
determining, by operation of a queue manager in the SAS device, a current workload based on entries in a queue of the SAS device where each entry corresponds to a SAS exchange utilizing one or more of the plurality of PHY logic circuits;
identifying, by operation of a power manager in the SAS device, from the current workload, one or more PHY logic circuits that may be placed in a low power mode; and
setting, by operation of the power manager, the identified PHY logic circuits into a low power mode,
wherein the step of setting comprises one or more of:

controllably disabling, via a plurality of clock gating circuits each coupled with a corresponding one of the plurality of PHY logic circuits, a clock signal coupled with the corresponding PHY logic circuit;

controllably altering, via a clock frequency control circuit coupled with a clock source coupled with a corresponding one of the plurality of PHY logic circuits, the clock frequency of the clock source coupled with the corresponding PHY logic circuit; or managing, via a plurality of power well control circuits each coupled with a power well associated with a corresponding one of the plurality of PHY logic circuits, an amount of power for the power wells.

12. The method of claim 11 further comprising:
determining, by operation of the power manager, one or more PHY logic circuits previously set to a low power mode that may be restored to normal operation based on the current workload.

13. The method of claim 11
wherein the SAS device further comprises one or more link logic circuits coupled with the PHY logic circuits,
wherein the method further comprises:
determining, by operation of the queue manager, a current workload based on entries in the queue where each entry corresponds to a SAS exchange utilizing one or more of the plurality of link logic circuits;
identifying, by operation of the power manager, from the current workload, one or more link logic circuits that may be placed in a low power mode; and
setting, by operation of the power manager, the identified link logic circuits into a low power mode.

14. The method of claim 13
wherein the SAS device further comprises one or Direct Memory Access (DMA) logic circuits coupled with the link logic circuits and/or with the PHY logic circuits,
wherein the method further comprises:
determining, by operation of the queue manager, a current workload based on entries in the queue where each entry corresponds to a SAS exchange utilizing one or more of the plurality of DMA logic circuits;
identifying, by operation of the power manager, from the current workload, one or more DMA logic circuits that may be placed in a low power mode; and
setting, by operation of the power manager, the identified DMA logic circuits into a low power mode.

15. The method of claim 11 further comprising:
awaiting completion of a transfer operation presently using a PHY logic circuit before setting the PHY logic circuit to the low power mode.

16. The method of claim 11 further comprising:
receiving a signal derived from another SAS device indicating a transmission to an identified PHY logic circuit presently in a low power mode; and
restoring normal operation of the identified PHY logic circuit in response to receipt of the signal.

17. The method of claim 11
wherein the step of identifying one or more PHY logic circuits further comprises:
comparing the current workload to one or more predetermined threshold values where each threshold value corresponds to a minimum number of PHY logic circuits to be in a full power operational mode; and
identifying the one or more identified PHY logic circuits the may be set to a low power mode based on the comparison determining the minimum number of PHY logic circuits to be in a full power operational mode.

18. The method of claim 17 further comprising:
identifying one or more PHY logic circuits presently in a low power mode to be restored to full power operation based on the comparison; and
restoring the identified one or more PHY logic circuits presently in a low power mode to full power operational mode.

* * * * *